(12) United States Patent
Ochs et al.

(10) Patent No.: US 7,707,855 B2
(45) Date of Patent: May 4, 2010

(54) METHOD FOR PRODUCING SYNTHETIC QUARTZ GLASS WITH PREDETERMINED HYDROXYL GROUP CONTENT

(75) Inventors: Stephan Ochs, Bad Camberg (DE); Bodo Kuehn, Gelnhausen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 538 days.

(21) Appl. No.: 11/801,386

(22) Filed: May 9, 2007

(65) Prior Publication Data

US 2007/0261442 A1   Nov. 15, 2007

(30) Foreign Application Priority Data

May 11, 2006  (DE)  .......................  10 2006 022 303

(51) Int. Cl.
*C03B 37/018*  (2006.01)
(52) U.S. Cl. .............................. 65/413; 65/422; 65/426; 65/427
(58) Field of Classification Search .................... 65/413, 65/422, 426, 427
See application file for complete search history.

(56) References Cited

U.S. PATENT DOCUMENTS

| 5,837,024 | A | 11/1998 | Fabian | |
| 6,966,201 | B2 * | 11/2005 | DiGiovanni et al. | .......... 65/395 |
| 2005/0187092 | A1 | 8/2005 | Bookbinder et al. | |
| 2006/0137400 | A1 * | 6/2006 | Hansen et al. | ............... 65/17.4 |

FOREIGN PATENT DOCUMENTS

| DE | 196 49 935 A1 | 6/1998 |
| JP | 62 143835 A | 6/1987 |

OTHER PUBLICATIONS

European Patent Office English language Abstract for JP 62143835 A, Jun. 27, 1987.
Japanese Patent Office, Patent Abstracts of Japan, Abstract for JP 62143835 A, Jun. 27, 1987.

* cited by examiner

*Primary Examiner*—Eric Hug
*Assistant Examiner*—Queenie Dehghan
(74) *Attorney, Agent, or Firm*—Tiajoloff and Kelly LLP

(57) ABSTRACT

A known method for producing synthetic quartz glass with a predetermined hydroxyl group content comprises the following steps: a porous $SiO_2$ soot body is produced by flame hydrolysis or oxidation of a silicon-containing start compound and by layerwise deposition of $SiO_2$ particles on a rotating support; the soot body is subjected to a dehydration treatment in a reaction gas-containing drying atmosphere at a drying temperature for removing hydroxyl groups; and the $SiO_2$ soot body is vitrified into a body consisting of the synthetic quartz glass. Starting from this, and in order to permit a reproducible and reliable manufacture of synthetic, UV-radiation resistant quartz glass with predetermined hydroxyl group content and low chlorine content, it is suggested according to the invention that the dehydration treatment according to method step (b) comprises a drying phase during which ozone is used as the reaction gas, whereby the ozone content of the drying atmosphere is between 0.5% by vol. and 10% by vol. and the drying temperature is chosen in the range between 1200° C. and 1400° C., and whereby no halogens are supplied to the drying atmosphere.

20 Claims, No Drawings

METHOD FOR PRODUCING SYNTHETIC QUARTZ GLASS WITH PREDETERMINED HYDROXYL GROUP CONTENT

The present invention relates to a method for producing synthetic quartz glass with predetermined hydroxyl group content, the method comprising the following steps:
(a) a porous $SiO_2$ soot body is produced by flame hydrolysis or oxidation of a silicon-containing start compound and by layerwise deposition of $SiO_2$ particles on a rotating support;
(b) the soot body is subjected to a dehydration treatment in a reaction gas-containing drying atmosphere at a drying temperature for removing hydroxyl groups; and
(c) the $SiO_2$ soot body is vitrified into a body consisting of the synthetic quartz glass.

For instance, optical components for microlithography or for preforms for optical fibers are made from synthetic quartz glass.

The soot body is a hollow cylinder or a solid cylinder of porous $SiO_2$ soot which is obtained according to the known VAD method (vapor axial deposition) or according to the OVD method (outside vapor deposition). As a rule, soot bodies have a high content of hydroxyl groups (OH groups) due to the manufacturing process. These have an impact on the optical transmission of the quartz glass obtained therefrom—typical OH absorption bands are for instance observed at wavelengths of 2.72 µm, 2.21 µm or 1.38 µm—and they have an impact on the resistance of quartz glass to short-wave UV radiation, for example on the damage patterns known as "compaction" and "decompaction".

Therefore, particular attention is in general paid to the observation of a predetermined content of hydroxyl groups during quartz glass manufacture, and a multitude of methods have been suggested for minimizing the hydroxyl group content or for setting it to a predetermined value.

For instance, DE 196 49 935 A1 describes a method for making a preform for optical fibers, in which a hollow cylindrical soot body is present as an intermediate product, the soot body being produced according to the "OVD method". Fine $SiO_2$ particles are here formed by flame hydrolysis of $SiCl_4$ and deposited by means of deposition burners layer by layer on a support tube rotating about its longitudinal axis. Due to this manufacturing method the soot body shows a high content of hydroxyl groups. To remove said groups, the porous blank is subjected to a dehydration treatment in which it is exposed in a dehydration furnace to a chlorine-containing atmosphere at a high temperature of about 1000° C. In this process OH groups are substituted by chlorine. Subsequently, the soot body treated in this way is introduced into an evacuable vitrification furnace and vitrified therein with formation of a transparent quartz glass cylinder which is used as a semifinished product for making an optical preform.

As a rule, the synthetic quartz glass produced in this way contains a certain amount of chlorine. It is however known that chlorine (similar to fluorine) may be detrimental to the UV radiation resistance of the quartz glass. To be more specific, chlorine effects a deterioration of the compaction behavior and contributes to induced birefringence under UV laser radiation. The damage pattern, which is known as "compaction", arises during or after laser irradiation with high energy density and manifests itself in a local density increase of the glass in the irradiated volume, which in turn leads to a locally inhomogeneous rise of the refractive index and thus to a deterioration of the imaging properties of the optical component.

Measures have therefore been suggested for eliminating chlorine from the porous soot body, for instance in US 2005/0187092. This publication deals with synthetic quartz glass of high UV radiation resistance for lenses, prisms and other optical components for a lithography device. A chlorine-free silicon-containing start compound is used for producing the quartz glass, and $SiO_2$ particles are produced from said start compound by flame hydrolysis and deposited on a support with formation of an $SiO_2$ soot body. This soot body is subjected to a dehydration treatment in which the soot body is treated at a temperature of 1050° C. in an atmosphere of helium with 2.7% chlorine for a period of 4 h. Although the chlorine treatment helps to remove impurities and to reduce the hydroxyl group content, it automatically leads to a loading of the soot body with chlorine. Subsequently, the $SiO_2$ soot body is treated in an intermediate treatment in an atmosphere consisting of helium with 3% oxygen and is slowly heated in this process for several hours to a temperature of 1490° C. and sintered to obtain a transparent quartz glass body having a hydroxyl group content of about 10 wt ppm.

The intermediate treatment in $He/O_2$ atmosphere serves to remove chlorine from the soot body. $H_2O$ and fluorine- or boron-containing substances are named as alternative reactants for removing chlorine from synthetic quartz glass.

The removal of chlorine from the soot body is here based on substance transportation processes (indiffusion and outdiffusion) and on chemical reactions. These processes are dependent on time and temperature. A complete removal of chlorine from a soot body is therefore particularly long-winded and expensive in the case of large soot wall thicknesses, and there is the risk that chlorine residues remain in the soot body, especially since a quantitative analysis is difficult in the case of low chlorine contents. Chlorine residues may lead to quality losses which will only be detected in a later process stage or during use of the quartz glass.

It is therefore the object of the present invention to indicate a method which permits a reproducible and reliable manufacture of synthetic, UV-radiation resistant quartz glass with predetermined hydroxyl group content and low chlorine content.

Starting from the above-mentioned method this object is achieved according to the invention in that the dehydration treatment according to method step (b) comprises a drying phase during which ozone is used as the reaction gas, whereby the ozone content of the drying atmosphere is between 0.5% by vol. and 10% by vol. and the drying temperature is chosen in the range between 1200° C. and 1400° C., and whereby no halogens are supplied to the drying atmosphere.

It has been found that ozone ($O_3$) can help to remove hydroxyl groups from quartz glass at high temperatures, for ozone molecules show an adequate reactivity to hydroxyl groups at high temperatures and are suited for displacing hydroxyl groups out of the $SiO_2$ soot body. Therefore, the use of ozone in combination with a high drying temperature helps to set a predetermined hydroxyl group content in quartz glass also without the use of chlorine or other halogens. This yields the following advantages:
(1) The drawbacks entailed by the use of chlorine and by the accompanying residual chlorine in the $SiO_2$ network with respect to UV-radiation induced birefringence and compaction of the quartz glass are reliably and reproducibly avoided.
(2) The risk of the formation of oxygen defects during the drying phase does not exist, for ozone is suited, on account of its oxidative effect, for saturating oxygen defects that are formed because of the thermally induced cleavage of OH groups from a silanol group (Si—OH), so that a siloxane bridge (Si—O—Si) may develop from such an oxygen defect either immediately or in a later process stage, the siloxane bridge being a constituent of the defect-free glass network.

(3) Since the use of chlorine for dehydration can be omitted altogether, a time-consuming and cost-intensive elimination of residual chlorine from the soot body by physical processes (diffusion) or chemical processes (reactions), like in the above-described known method, is not necessary, especially since the complete removal of chlorine from the $SiO_2$ soot can hardly be detected quantitatively in a reliable manner.

The drying temperature plays an important role for the efficiency of the drying process. As a rule, an increasing drying temperature is accompanied by an acceleration of the drying reaction. The higher the drying temperature has been chosen, the more efficient will be the ozone-supported drying of the soot body. This, however, is counteracted by the effect that at high temperatures (above 1150° C.) sintering of the $SiO_2$ soot body starts, which leads to a densification and thus to a deceleration of the drying reaction. Therefore, at very high drying temperatures (above 1400° C.) and during long drying periods sintering of the soot body may lead to a densification of the $SiO_2$ soot that will prevent further drying. As for the method of the invention, an optimum has been found with respect to a drying period that is as short as possible if the drying temperature is chosen to be in the range between 1200° C. and 1400° C.

Drying temperature is here understood to be the temperature measured on the surface of the soot body by means of a pyrometer.

The ozone content in the drying atmosphere is between 0.5% by vol. and 10% by vol.

The dehydration treatment comprises a drying phase using a reaction gas in the form of ozone. Moreover, the dehydration treatment may include other drying measures, such as a treatment of the soot body at a negative pressure. At any rate, however no halogens are supplied to the drying atmosphere during the dehydration treatment in order to avoid the above-explained drawbacks entailed by halogens with respect to the impairment of the UV radiation resistance.

The quartz glass obtained according to the method of the invention shows a predetermined hydroxyl group content that may also be low (up into the ppb range (wt. ppb)), at a simultaneously reproducibly low chlorine content which can also be below the detection limit. The quartz glass produced in this way is further distinguished by a high UV radiation resistance, particularly with respect to induced birefringence and compaction of the quartz glass.

It has turned out to be particularly advantageous when the drying atmosphere contains helium and ozone.

Helium diffuses into quartz glass particularly rapidly so that the risk of bubble formation during vitrification by entrapped gases is reduced. Moreover, helium is distinguished by a very high thermal conductivity, so that the periods and temperatures needed for drying are comparatively short or low, respectively. It is also important that helium behaves inert to ozone and thus shows no disadvantageous impact on the reactivity of said drying agent.

Ozone is thermodynamically instable and decomposes easily, also in an explosion like manner, into oxygen. Surprisingly enough, however, it has been found that low ozone concentrations in the drying atmosphere, particularly in combination with a helium atmosphere, high drying temperatures, and during washing, efficiently remove hydroxyl groups from the soot body. Preferably, the ozone content in the drying atmosphere is between 0.5% by vol. and 10% by vol., particularly preferably between 1.5% by vol. and 5% by vol.

In this context ozone content is understood to be that content of ozone in the furnace atmosphere that is arithmetically obtained on the basis of the ozone amount fed into the drying atmosphere. At ozone contents below said lower limit of 0.5% by vol., preferably 1.5% by vol., the effect as to the promotion of the drying process and the prevention of oxygen defects is small. On the other hand, high ozone contents of more than 10% by vol. in the furnace atmosphere increase the physical and chemical solubility of oxygen in the soot body, which in subsequent process steps may lead to the formation of bubbles or to defects in the network structure of the quartz glass, such as peroxide defects (Si—O—O—Si), which contribute to an additional optical absorption or to a deterioration of the UV radiation resistance.

It has turned out to be particularly useful when the vitrification of the soot body according to method step (c) is carried out in an ozone-containing atmosphere.

The elevated temperatures during vitrification of the soot body promote the ozone-supported reduction of the hydroxyl group content of the soot body. Moreover, due to its oxidative effect, as has already been explained above with reference to drying, the ozone present in the vitrification atmosphere continues to prevent or reduce the formation of oxygen defects that are created during the thermally induced cleavage of hydroxyl groups from the $SiO_2$ glass network.

In a particularly preferred procedure the soot body is vitrified directly following the dehydration treatment, the atmosphere containing ozone and helium during vitrification.

Thus the atmosphere during vitrification does not differ, or does not differ considerably, from the preferred atmosphere during drying. This avoids the drawbacks that are known to be entailed by a change in atmosphere, for instance the period of time for complete gas exchange, the hardly reproducible influence of existing residual gases, the period for setting the thermal and chemical balance in the new atmosphere, or the like. The dehydration treatment and the subsequent vitrification of the soot body are carried out in different furnaces, but preferably in the same furnace, as contamination of the dried soot body and particularly a re-contamination with hydroxyl groups can here be easily avoided.

A further improvement with respect to the efficiency of the drying process is achieved when the ozone is generated by means of an ozone generator directly before its use.

Moreover, this procedure takes into account the low stability of ozone and is applicable to both the dehydration treatment and the vitrification of the soot body.

The above-explained drawbacks entailed by halogens with respect to the impairment of the UV radiation resistance are avoided since no halogens are added to the drying atmosphere.

In this respect it has also turned out to be useful when no halogens are supplied to the atmosphere also during the vitrification of the $SiO_2$ soot body.

A procedure is preferred in which the soot body has a density ranging between 20% and 30% of the density of quartz glass at least at the beginning of the drying phase.

At a density of more than 30% there will be a long treatment period for the dehydration treatment of the soot body. Soot bodies with a density below 20% of the density of quartz glass are mechanically less stable and thus difficult to handle.

EXAMPLE $SiO_2$ soot particles are formed by flame hydrolysis of $SiCl_4$ in the burner flame of a deposition burner and deposited layer by layer by means of the OVD method on a support rod rotating about its longitudinal axis with formation of a soot body of porous $SiO_2$. After the deposition process has been completed, the support rod is removed. A cylinder of transparent quartz glass is produced from the resulting soot tube having a wall thickness of 110 mm, a density of about 25% of the density of quartz glass and a hydroxyl group content of about 400 wt ppm with the help of the method explained by way of example in the following:

The soot tube is subjected to a dehydration treatment for removing the hydroxyl groups introduced by the manufacturing process. To this end the soot tube is introduced in vertical orientation into a dehydration and vitrification furnace and treated at a temperature of about 1210° C. in a washing process in an atmosphere consisting of helium with 3% by vol. of ozone. The treatment lasts 96 hours.

Subsequently, the soot tube pretreated in this way is sintered (vitrified) inside the same furnace for obtaining a body of transparent quartz glass in an atmosphere which, like in the dehydration treatment, consists of helium with 3% by vol. of ozone. The temperature of the heating element is preset to 1600° C., whereby a maximum temperature of about 1580° C. is obtained on the surface of the soot body. A melt front is here traveling over the whole length of the soot tube from the outside to the inside.

Subsequently, the hydroxyl group content is determined by spectroscopy over the whole tube length of the vitrified tube. A mean hydroxyl group content of 30 wt ppm was observed. The quartz glass is free from chlorine and also free from other halogens.

The hydroxyl group content of the vitrified tube is obtained by measurement of the IR absorption according to the method of D. M. Dodd et al. ("Optical Determinations of OH in Fused Silica", (1966), page 3911).

The vitrified quartz glass tube is then processed by means of the general and customary forming and homogenizing processes into a solid cylinder having an outer diameter of 300 mm and a height of 80 mm. This cylinder serves as a lens blank for a projection objective that is distinguished by high transparence in the short-wave UV range and by high UV radiation resistance and is suited for use in microlithography.

Comparative Example

A soot tube with the dimensions and a density of about 25% of the density of quartz glass is produced by means of outside deposition, as has been described above with reference to Example 1. The soot tube is subjected to a dehydration treatment using chlorine. To this end the soot tube is introduced in vertical orientation into a dehydration and vitrification furnace and is first treated at a temperature of around 900° C. in a chlorine-containing atmosphere. The treatment lasts 3 hours.

Subsequently, the soot tube pretreated in this way is vitrified in the same furnace, the temperature of the heating element being preset to 1600° C. A maximum temperature of about 1580° C. is observed on the surface of the soot tube.

The hydroxyl group content of the vitrified tube was determined, as described above with reference to Example 1. A mean OH content of 30 wt ppm is measured.

The sintered (vitrified) quartz glass tube was subsequently processed by means of the general and customary forming and homogenizing processes into a solid cylinder having an outer diameter of 300 mm and a height of 80 mm. Upon irradiation with UV laser radiation of a wavelength of 193 nm the quartz glass showed a degree of induced birefringence and compaction that suggests that it is not suited for applications where particularly high demands are made on UV radiation resistance, and which is evidently due to a still existing content of chlorine in the quartz glass.

The invention claimed is:

1. A method for producing synthetic quartz glass with a predetermined hydroxyl group content, the method comprising:
    (a) producing a porous $SiO_2$ soot body by flame hydrolysis or oxidation of a silicon-containing start compound and by layerwise deposition of $SiO_2$ particles on a rotating support;
    (b) subjecting the soot body to a dehydration treatment in a drying atmosphere containing a reaction gas at a drying temperature so as to remove for removing hydroxyl groups; and
    (c) vitrifying the $SiO_2$ soot body into a body comprising the synthetic quartz glass,
    wherein the dehydration treatment comprises a drying phase during which the reaction gas is ozone, wherein the drying atmosphere has an ozone content that is between 0.5% by vol. and 10% by vol., and the drying temperature is in a range between 1200° C. and 1400° C., and wherein no halogens are supplied to the drying atmosphere during the dehydration treatment.

2. The method according to claim 1, wherein the drying atmosphere contains helium and ozone.

3. The method according to claim 1, wherein the ozone content of the drying atmosphere is between 1.5% by vol. and 5% by vol.

4. The method according to claim 1, wherein vitrification of the soot body is carried out in an ozone-containing atmosphere.

5. The method according to claim 4, wherein the soot body is vitrified directly following the dehydration treatment, the ozone-containing atmosphere containing ozone and helium during vitrification.

6. The method according to claim 4, wherein no halogens are supplied to the atmosphere during vitrification of the $SiO_2$ soot body.

7. The method according to claim 1, wherein the ozone is generated by an ozone generator directly before use thereof as the reaction gas.

8. The method according to claim 1, wherein at the beginning of the drying phase the soot body has a density of not more than 30% of the density of quartz glass.

9. The method according to claim 1, wherein the drying temperature is in a range between 1200° C. and 1300° C.

10. A method for producing synthetic quartz glass, the method comprising:
    producing a porous $SiO_2$ soot body by flame hydrolysis or oxidation of a silicon-containing starting compound and by deposition of $SiO_2$ particles on a rotating support;
    subjecting the soot body to a dehydration treatment in a drying atmosphere containing a reaction gas at a drying temperature so as to remove hydroxyl groups; and
    vitrifying the $SiO_2$ soot body into a body having the synthetic quartz glass therein;
    wherein the reaction gas is ozone, and the drying temperature is in a range between 1200° C. and 1400° C.; and
    wherein, said drying atmosphere is formed at least in part by supply of a drying atmosphere gas or gas mixture, the drying atmosphere gas or gas mixture being such that the drying atmosphere has an ozone content that is between 0.5% by vol. and 10% by vol., and the drying atmosphere gas or gas mixture supplied containing no halogens, or substantially no halogens.

11. The method according to claim 10, wherein the drying atmosphere contains helium and ozone.

12. The method according to claim 10, wherein the ozone content of the drying atmosphere is between 1.5% by vol. and 5% by vol.

13. The method according to claim 10, wherein vitrification of the soot body is carried out in an ozone-containing atmosphere.

14. The method according to claim 13, wherein the soot body is vitrified directly following the dehydration treatment, and the ozone-containing atmosphere contains ozone and helium.

15. The method according to claim 10, wherein the ozone is generated by an ozone generator directly before use thereof in the reaction gas.

16. The method according to claim 10, wherein the vitrification of the $SiO_2$ soot body is performed in an atmosphere derived at least in part from an additional gas or gas mixture supplied to the $SiO_2$ soot body following the dehydration treatment, and the additional gas or gas mixture contains substantially no halogens.

17. The method according to claim 10, wherein the vitrification of the $SiO_2$ soot body is performed in the dehydration atmosphere following the dehydration treatment.

18. The method according to claim 10, wherein at the beginning of the drying phase the soot body has a density of not more than 30% of the density of quartz glass.

19. The method according to claim 10, wherein the drying temperature is in a range between 1200° C. and 1300° C.

20. The method according to claim 10, wherein the drying treatment and vitrification treatment are both performed in a single furnace.

* * * * *